(12) United States Patent
Purrucker et al.

(10) Patent No.: US 10,940,590 B2
(45) Date of Patent: Mar. 9, 2021

(54) CALIBRATING A SYSTEM WITH A CONVEYING MEANS AND AT LEAST ONE ROBOT

(71) Applicant: KUKA Deutschland GmbH, Augsburg (DE)

(72) Inventors: Thomas Purrucker, Munich (DE); Robert Miller, Scheuring (DE); Ralf Mittmann, Mering (DE); Daniele Sagnotti, Augsburg (DE); Manuela Hauschild, Aindling (DE); Benno Eichner, Schöngeising (DE); Stephan Clair, Lauingen (DE); Felix Lückert, Augsburg (DE); Markus Hager, Augsburg (DE); Maximilian Lindner, Kissing (DE)

(73) Assignee: KUKA Deutschland GmbH, Augsburg (DE)

( * ) Notice: Subject to any disclaimer, the term of this patent is extended or adjusted under 35 U.S.C. 154(b) by 334 days.

(21) Appl. No.: 15/774,760

(22) PCT Filed: Nov. 4, 2016

(86) PCT No.: PCT/EP2016/001841
§ 371 (c)(1),
(2) Date: May 9, 2018

(87) PCT Pub. No.: WO2017/080640
PCT Pub. Date: May 18, 2017

(65) Prior Publication Data
US 2018/0361587 A1 Dec. 20, 2018

(30) Foreign Application Priority Data
Nov. 10, 2015 (DE) .................. 10 2015 014 485.5

(51) Int. Cl.
*B25J 9/16* (2006.01)
*G05B 19/418* (2006.01)
*B25J 9/00* (2006.01)

(52) U.S. Cl.
CPC ........... *B25J 9/1692* (2013.01); *B25J 9/0093* (2013.01); *G05B 19/4182* (2013.01);
(Continued)

(58) Field of Classification Search
USPC ................................................. 700/245–264
See application file for complete search history.

(56) References Cited

U.S. PATENT DOCUMENTS 5,727,132 A * 3/1998 Arimatsu ........... G05B 19/4083
700/259
6,163,946 A * 12/2000 Pryor .................... A01B 69/008
29/407.04

(Continued)

FOREIGN PATENT DOCUMENTS

CN 101537617 A 9/2009
CN 102216860 A 10/2011
(Continued)

OTHER PUBLICATIONS

European Patent Office; Search Report in related International Patent Application No. PCT/EP2016/001841 dated Feb. 10, 2017; 6 pages.
(Continued)

*Primary Examiner* — Jonathan L Sample
(74) *Attorney, Agent, or Firm* — Dorton & Willis, LLP (57) ABSTRACT

A method for calibrating a system with a conveying apparatus and at least a first robot includes determining the positions of at least three measuring points of a first component transported by the conveying apparatus in a first transport position using the first robot. The method further
(Continued)

includes determining the position of at least one of the measuring points in a second transport position using the first robot, or determining the positions of at least two of the measuring points of the component in a third transport position and the position of at least one other measuring point in the third transport position or at least one of these measuring points in a fourth transport position using at least one second robot.

19 Claims, 4 Drawing Sheets

(52) U.S. Cl.
CPC .............. *G05B 2219/39022* (2013.01); *G05B 2219/39024* (2013.01); *G05B 2219/39102* (2013.01); *G05B 2219/39401* (2013.01)

(56) References Cited

U.S. PATENT DOCUMENTS

| | | | |
|---|---|---|---|
| 6,278,906 B1* | 8/2001 | Piepmeier | B25J 9/1607 |
| | | | 700/245 |
| 9,233,470 B1* | 1/2016 | Bradski | B25J 9/1694 |
| 9,424,470 B1* | 8/2016 | Hinterstoisser | B25J 9/0093 |
| 2002/0013675 A1* | 1/2002 | Knoll | B25J 9/1692 |
| | | | 702/150 |
| 2010/0036525 A1* | 2/2010 | Casanelles | B25J 9/1682 |
| | | | 700/248 |
| 2010/0281705 A1 | 11/2010 | Verdi et al. | |
| 2011/0022216 A1* | 1/2011 | Andersson | G05B 19/401 |
| | | | 700/114 |
| 2012/0017507 A1* | 1/2012 | Owens, Jr. | A01G 9/143 |
| | | | 47/1.01 P |
| 2012/0022691 A1* | 1/2012 | Owens, Jr. | B25J 9/1687 |
| | | | 700/259 |
| 2012/0229620 A1* | 9/2012 | Ikeda | B25J 9/1692 |
| | | | 348/94 |
| 2012/0271590 A1 | 10/2012 | Sakhare et al. | |
| 2013/0238125 A1* | 9/2013 | Suzuki | B25J 9/1612 |
| | | | 700/253 |
| 2014/0088765 A1* | 3/2014 | Valpola | B25J 9/1697 |
| | | | 700/259 |
| 2014/0148949 A1* | 5/2014 | Graca | G05B 19/41815 |
| | | | 700/248 |
| 2014/0277716 A1 | 9/2014 | Miyahara et al. | |
| 2015/0032252 A1* | 1/2015 | Galluzzo | B25J 9/162 |
| | | | 700/218 |
| 2015/0032256 A1* | 1/2015 | Hashiguchi | G05B 19/41845 |
| | | | 700/248 |
| 2015/0032257 A1* | 1/2015 | Hashiguchi | B25J 9/1674 |
| | | | 700/248 |
| 2015/0063972 A1* | 3/2015 | Girtman | B25J 15/0052 |
| | | | 414/796.9 |
| 2015/0217443 A1* | 8/2015 | Tadayon | B25J 5/02 |
| | | | 700/253 |
| 2016/0016311 A1* | 1/2016 | Konolige | B25J 9/1612 |
| | | | 700/245 |

FOREIGN PATENT DOCUMENTS

| | | |
|---|---|---|
| CN | 103853133 A | 6/2014 |
| DE | 4115846 A1 | 11/1992 |
| DE | 10150225 A1 | 4/2003 |
| DE | 10162967 B4 | 8/2013 |
| DE | 102013113165 A1 | 6/2014 |
| EP | 1375083 A2 | 1/2004 |
| EP | 2188586 B1 | 5/2014 |
| JP | 2014104581 A | 6/2014 |

OTHER PUBLICATIONS

German Patent Office; Office Action in related German Patent Application No. 10 2015 014 485.5 dated Oct. 26, 2016; 5 pages.
R.E Deakin; Publication entitled "3D Coordinate Transformations" published Dec. 31, 1998; 15 pages.
Korean Patent Office; Examination Report in related Korean Patent Application No. 10-2018-7015183 dated May 30, 2019; 8 pages.
Chinese Patent Office; Office Action in related Chinese Patent Application No. 201680065753.8 dated Jul. 22, 2020; 5 pages.
Chinese Patent Office; Search Report in related Chinese Patent Application No. 201680065753.8 dated Jul. 17, 2020; 2 pages.

* cited by examiner

CALIBRATING A SYSTEM WITH A CONVEYING MEANS AND AT LEAST ONE ROBOT

CROSS-REFERENCE

This application is a national phase application under 35 U.S.C. § 371 of International Patent Application No. PCT/EP2016/001841, filed Nov. 4, 2016 (pending), which claims the benefit of German Patent Application No. DE 10 2015 014 485.5 filed Nov. 10, 2015, the disclosures of which are incorporated by reference herein in their entirety.

TECHNICAL FIELD

The present invention relates to a method for calibrating a system with a conveying means and one or more robots, as well as to such a system with a controller and to a computer program product for carrying out the method.

BACKGROUND

The document DE 101 62 967 B4 discloses a system comprising a plurality of robots for interaction with components that are transported by a conveying means.

For each robot there is provided a conveying means coordinate system having an X axis that is parallel to the direction of motion of the conveying means and a Y axis that is also in the plane of transport of the conveying means; in addition, a transformation into a respective robot coordinate system is provided for each robot.

If actions in a component-fixed coordinate system are to be defined, then for each component-fixed coordinate system a further transformation between this and the respective conveying means coordinate system is required.

In order to calibrate a coordinate system, the position of at least three measuring points, for example, the origin of the coordinate system, a further point on a coordinate axis and an another point in a coordinate axis plane, has to be determined on a routine basis.

Correspondingly for m robots and n different component-fixed coordinate systems it has been necessary to date to determine 6×m×n positions in order to calibrate the system.

The swapping of a robot or a modification of a transport position determining means, by means of which a (synchronization) position of a component-fixed coordinate system is detected, requires correspondingly time consuming (re)calibrations.

The object of the present invention is to improve the calibration of a system comprising at least one robot and a conveying means.

This object is achieved by a method as disclosed herein.

SUMMARY

In one embodiment of the present invention a system comprises a conveying means for transporting components and one or more robots, one of which is referred to hereinafter as the first robot for reference purposes without limiting the generality.

In one embodiment the conveying means is a linear conveying means having a direction of transport or motion that is linear at least in segments, in particular, uniform. Said conveying means may comprise, in particular, may be, in particular, at least one conveyor belt. Similarly the conveying means may also exhibit curved and/or staggered and/or inclined directions of transport.

In one embodiment the first robot may be a first robot in the direction of transport.

In one embodiment one or more robots of the system have at least three, in particular, at least six, in particular, at least seven, actuated, in particular, motorized axes of motion, in particular, axes of rotation, and/or linear axes.

In one embodiment the system comprises a controller for controlling the robots. The controller can have, in particular, one or more robot controllers, which are designed for controlling one or more robots of the system and which in one embodiment (can) communicate with each other or (can) exchange data or are configured for this purpose, in particular, are connected according to data (transmission) technology.

In one embodiment the robots of the system handle and/or machine components, which are transported by the conveying means, or are configured for this purpose, in particular, according to hardware and/or software technology, in particular, program technology, in particular, their (robot) controller(s).

In one embodiment the handling or machining is synchronized with the movement of the conveying means. This synchronization can be carried out, in particular, by specifying a movement of the robot(s) on the basis of a component-fixed coordinate system, in which, for example, gripping or machining positions, in particular, gripping or machining paths, are or will be specified, where in this case these positions are approached or processed by the controller, based on a transport position or an advance of the conveying means relative to a synchronization position, based on a calibrated transformation between the component-fixed and a conveying means base-fixed coordinate system, and based on a calibrated transformation between the conveying means base-fixed and a robot-fixed, in particular, a robot base-fixed, coordinate system.

A conveying means base-fixed coordinate system is, as already apparent from the name, (location) fixed with respect to the base of the conveying means (said base being environment-fixed of fixed relative to the robot), where in this case a transport plane, such as, for example, a conveyor belt, of the conveying means and, thus, also measuring point systems, in particular, components, transported by the conveying means, move relative to the base of the conveying means or to this conveying means base-fixed coordinate system, preferably in a coordinate plane along a coordinate direction or coordinate axis of the coordinate system. If, therefore, a position and/or an orientation between the robot (base) and the conveying means (base) changes, then a transformation between the conveying means base-fixed and the robot-fixed coordinate system also changes accordingly.

In one embodiment a method for calibrating the system comprises the step of:

determining the positions of at least, in particular, exactly, three measuring points of a first measuring point system, in particular, a component, transported by the conveying means, in a transport position by means of the first robot.

This can be done, in particular, by probing the measuring points by means of the robot, in particular, a robot-guided measuring tool. Similarly, (at least) two measuring point positions can be determined, for example by detecting, in particular, traversing, a predetermined straight line; (at least) three measuring point positions can be determined by detecting, in particular, traversing, a predetermined plane by means of the robot.

According to one aspect of the present invention, the method additionally comprises the step of:

determining the position of at least, in particular, exactly, one of these measuring points in another transport position of the conveying means or the measuring point system, in particular, a component, transported by the conveying means, by means of the first robot.

Consequently in one embodiment both a conveying means base-fixed and a measuring point system-fixed, in particular, a component-fixed coordinate system, in particular, both a transformation between a robot-fixed coordinate system and the conveying means base-fixed coordinate system as well as a transformation between the conveying means base-fixed and the measuring point system-fixed, in particular, component-fixed coordinate system, can be determined advantageously with only a few, in particular, with just four, measurements or position determinations. If several measurements or position determinations are carried out, then the precision of the calibration can be improved, in particular, by averaging.

A measuring point system-fixed, in particular, a component-fixed coordinate system W of a measuring point system, in particular, a component, W, transported by the conveying means (into the transport position), can be clearly determined by means of just the three measuring point positions in the one transport position.

In one embodiment an origin of this measuring point system-fixed, in particular, component-fixed coordinate system may lie in one of the three measuring point positions; a coordinate axis of the coordinate system may run through said measuring point position and another of the three measuring point positions; and similarly a further coordinate axis of the coordinate system may also lie in a plane defined by the three measuring point positions.

In one further development the origin may or might be displaced in the opposite direction of the direction of transport of the conveying means into a synchronization position, after which or from which a transport position determining means determines a transport position of the measuring point system, in particular, component; in particular, a synchronization switch is triggered.

On the basis of the position of one of these three measuring points in the one and the other transport position, a direction of transport of the conveying means can be determined; on the basis of the position of another of these three measuring points in the one transport position, a transport plane of the conveying means, and, thus, a conveying means base-fixed coordinate system C.

In one embodiment a coordinate axis of a conveying means base-fixed coordinate system C may extend through the positions of the one measuring point in the two transport positions; a further coordinate axis of this coordinate system may lie in the plane, in which another of the measuring point positions lies. In one embodiment the origin of the conveying means base-fixed coordinate system may be in one of the positions of the one measurement point.

In one embodiment a transformation $T_{R1, C1}$ between a conveying means base-fixed coordinate system C1 and a robot-fixed coordinate system R1 of the first robot is determined accordingly on the basis of at least, in particular, exactly, three of the four positions determined by means of the first robot.

In this case a transformation $T_{A, B}$ between a coordinate system A and a coordinate system B in the context of the present invention may, as a general principle, also be referred to as the transformation from the coordinate system A into the coordinate system B and from the coordinate system B into the coordinate system A, since the one can be determined from the other.

In particular, a transformation in the context of the present invention provides the description of a position vector in the two coordinate systems; thus, it can describe or depend on the rotation and displacement of the two coordinate systems with respect to each other and, for example, may or might be parameterized by means of Denavit-Hartenberg parameters, quaternions, a rotation matrix and a displacement vector or the like.

As an alternative or advantageously in addition, in one embodiment a transformation $T_{C1, W11}$ between a measuring point system-fixed, in particular, a component-fixed coordinate system W11 of the first measuring point system, in particular, a component, and the first robot and the conveying means base-fixed coordinate system C1 of the first robot is (also) determined accordingly on the basis of at least, in particular, exactly three of the four positions determined by the first robot. In particular, it is possible to determine from the three measuring point positions in the one transport position, in particular, subject to displacement in the opposite direction of the direction of transport into the synchronization position, from which the transport positions are determined or measured, the measuring point system-fixed, in particular, component-fixed coordinate system W11 in the robot-fixed coordinate system R1 of the first robot, therefrom the transformation $T_{R1, W11}$ and from this the transformation $T_{C1, W11} = T_{R1, W11} (T_{R1, C1})^{-1}$ are determined, in particular, by the (robot) controller of the first robot.

According to an additional aspect of the present invention, which may be advantageously combined with the aforementioned aspect, the method comprises the step of:

(in each case) determining the positions of at least, in particular, exactly, two measuring points of the first measuring point system, in particular, component, in a transport position and the position of at least, in particular, exactly, one further measuring point in this transport position or of at least in particular, exactly, one of these measuring points in another transport position by means of one or more second robots of the system.

In one embodiment the measuring points are the same measuring points, the positions of which have already been determined by means of the first robot.

In one embodiment a conveying base-fixed coordinate system C2 of the second robot, the position and orientation of which relative to the conveying means base-fixed coordinate system C1 of the first robot are known, can be determined or defined advantageously in each case by means of the measuring point positions, determined by the second robot(s), of the measuring point system, in particular, component, in one or two known transport positions.

As a result, in one embodiment a transformation $T_{C2, W12}$ between this conveying means base-fixed coordinate system C2 of the second robot and a measuring point system-fixed, in particular, component-fixed coordinate system W12 of a measuring point system, in particular, component, and the second robot can be determined on the basis of a known transformation $T_{C1, W11}$ between the conveying means base-fixed coordinate system C1 of the first robot and a measuring point system-fixed, in particular, component-fixed coordinate system W11 of the measuring point system, in particular, component, and the first robot or on the basis of a known transformation $T_{W11, W12}$ between the measuring point system-fixed, in particular, component-fixed coordinate system W11 of the measuring point system, in particular, component, and the first robot and the measuring point system-fixed, in particular, component-fixed coordinate system W12 of another measuring point system, in particular, component, and the first robot.

As a result, it is possible to dispense advantageously with calibrating the measuring point system, in particular, component, or its measuring point system-fixed, in particular, component-fixed coordinate system and/or with an, in particular, additional, calibration of a conveying means base-fixed coordinate system of the second robot by means of the second robot.

In one advantageous further development the conveying means base-fixed coordinate systems C1, C2 of the first and the second robot(s) exhibit the same orientation. Then for the transformation $T_{C2, W12}$ the orientation or rotation of the transformation $T_{C1, W11}$ may be applied directly or identically. In a further development the coordinate systems C1, C2 are displaced relative to each other at most in the direction of transport. In particular, then the displacement of the two coordinate systems can be determined from the transport positions. In particular, for the transformation $T_{C2, W12}$ the displacement, supplemented with this former displacement, can be applied (in) the transformation $T_{C1, W11}$. If in a further development the conveying means base-fixed coordinate systems C1, C2 of the first and second robot also have the same position of (their) origin, then the transformation $T_{C1, W11}$ may even be applied completely directly or identically as the transformation $T_{C2=C1, W12=W11}$; otherwise, for the transformation $T_{C2, W12}$ the displacement of the two coordinate systems C1, C2 may be considered.

Accordingly, in one embodiment a transformation between a robot-fixed coordinate system R2 and a conveying means base-fixed coordinate system C2 of the second robot(s) is determined (respectively) on the basis of at least three measuring point positions, determined by means of the second robot, in particular, in an identical or analogous manner as the transformation between the robot-fixed coordinate system R1 and the conveying means base-fixed coordinate system C1 of the first robot.

As an alternative or advantageously in addition, in one embodiment accordingly for one or more measuring point systems, in particular, components, which are transported by the conveying means and have measuring point system-fixed, in particular, component-fixed coordinate systems that differ from each other and that in particular, have different orientations and/or positions transverse to the direction of transport of the conveying means, a transformation $T_{C2, W12/W22}$ between a measuring point system-fixed, in particular, component-fixed coordinate system W12/W22 of the measuring point system, in particular, component, transported by the conveying means, and the conveying means base-fixed coordinate system C2 of the second robot(s) is determined (in each case) on the basis of a transformation $T_{C1, W1/W21}$ between the measuring point system-fixed, in particular, component-fixed coordinate system of this measuring point system, in particular, component, and the conveying means base-fixed coordinate system C1 of the first robot or on the basis of a transformation $T_{W11, W21}$ between the measuring point system-fixed, in particular, component-fixed coordinate system of this measuring point system, in particular, component, and a measuring point system-fixed, in particular, component-fixed coordinate system of another, in particular, the first, measuring point system, in particular, component, and the first robot.

In one embodiment the transformation $T_{C1, W11/W21}$ between the measuring point system-fixed, in particular, component-fixed coordinate system of the measuring point system, in particular, component, and the conveying means base-fixed coordinate system C1 of the first robot is determined in each case by its (robot) controller and transmitted to the (robot) controller(s) of the second robot(s), which controller in turn determines (respectively) on this basis the transformation $T_{C2, W12/W22}$ between the measuring point system-fixed, in particular, component-fixed coordinate system W12/W22 of the measuring point system, in particular, component, W1 or W2, transported by the conveying means, and the conveying means base-fixed coordinate system C2 of the second robot.

In another embodiment the transformation $T_{W11, W21}$ between the measuring point system-fixed, in particular, component-fixed coordinate systems of two measuring point systems, in particular, components, and the first robot is determined in each case by its (robot) controller, in particular, on the basis of the transformations $T_{C1, W11/W21}$ between these measuring point system-fixed, in particular, component-fixed coordinate systems and the conveying means base-fixed coordinate system C1 of the first robot, and is transmitted to the (robot) controller(s) of the second robot(s), which controller in turn determines (in each case) on this basis the transformation $T_{C2, W22}$ between the measuring point system-fixed, in particular, component-fixed coordinate system W22 of the measuring point system, in particular, component, W2, transported by the conveying means, and the conveying means base-fixed coordinate system C2 of the second robot.

Owing to the transmission and use of the relative transformation to or in the (robot) controller of the second robot(s), a displacement of the conveying means base-fixed coordinate systems of the first and second robot is already taken into account in an advantageous way. For this purpose, in one embodiment the transformation $T_{C2, W22}$ between the measuring point system-fixed, in particular, component-fixed coordinate system W22 of the measuring point system, in particular, component, W2, transported by the conveying means, and the conveying means base-fixed coordinate system C2 of the second robot is (also) determined on the basis of the transformation $T_{C2, W12}$ between the measuring point system-fixed, in particular, component-fixed coordinate system W12 of the other measuring point system, in particular, component, W1, transported by the conveying means, and the conveying means base-fixed coordinate system C2 of the second robot; in particular, said transformation in turn may or might be determined in the manner explained above on the basis of the transformation $T_{C1, W11}$ between the measuring point system-fixed, in particular, component-fixed coordinate system of the other measuring point system, in particular, component, W1 and the conveying means base-fixed coordinate system C1 of the first robot.

In one embodiment the measuring point system-fixed, in particular, component-fixed coordinate systems of the first and/or the second robot(s) are or will be moved into the same synchronization position or have the same origin. In this way, in particular, the synchronization of the robots with the conveying means and/or each other can be improved.

In one embodiment a transport position determining means detects, in particular, optically, a passing of a measuring point system, in particular, a component, in particular, a passing of a synchronization position by a measuring point system, in particular, a component, or is configured for this purpose. In particular, said transport position determining means may comprise a camera for this purpose.

In one embodiment this camera is calibrated by means of the first measuring point system, in particular, component. In particular, for this purpose in a further development the first measuring point system, in particular, component, can be arranged, in particular, by means of the conveying means in the field of view of the camera; and intrinsic and/or extrinsic camera parameters can be determined on the basis of the camera image.

In addition or as an alternative, in one embodiment a or the transport position determining means detects, in particular, electrically, a transport path or a (transport) movement of the conveying means or is configured for this purpose. Said transport position determining means may comprise, in particular, a rotary encoder for this purpose.

In one embodiment the transport position determining means, in particular, a transmission ratio, in particular, a rotary encoder transmission ratio of the encoder, is calibrated on the basis of the position, determined by the first robot, of at least one of the measuring points in the one and in the other transport position: by determining the positions of the same measuring point in the one and in the other transport position, it is possible to determine, in particular, a (transport) distance, traveled by the measuring point and, thus, also the conveying means. By comparing this (transport) distance with the distance, which the transport position determining means has detected in this case or between the one and the other transport position, in particular, with the angle of rotation, which the encoder has detected between the one and the other transport position, it is possible to calibrate the transport position determining means; in particular, an encoder transmission ratio between the (transport) distance of the conveying means and the distance of the transport position determining means, in particular, the angle of rotation of the encoder can be determined.

In one embodiment it is possible to dispense advantageously with an additional recalibration of measuring point systems, in particular, components, by one or more second robots, in particular, even after a modification of a or the transport position determining means for determining transport positions.

In one embodiment a transport position of a measuring point system, in particular, a component, is determined on the basis of a movement, detected by the transport position determining means, of the conveying means relative to a synchronization position; and in one embodiment said synchronization position or its presence or the reaching thereof by the measuring point system, in particular, component, is determined in turn on the basis of a detection of the corresponding measuring point system, in particular, component, transported by the conveying means, by the transport position determining means.

In particular, a transport position may indicate or depend on the path of a measuring point system, in particular, a component, that the measuring point system, in particular, component, has traveled due to transport by the conveying means, since said measuring point system has been captured by a camera at a predetermined, conveying means base-fixed location.

If now, for example, the camera is exchanged or placed at a different location, then the synchronization positions of the measuring point systems, in particular, components, or measuring point system-fixed, in particular, component-fixed coordinate systems change accordingly.

Since, however, the transformation $T_{C2, W'12}$ between a measuring point system-fixed, in particular, component-fixed coordinate system W'12 of the measuring point system, in particular, component, W1, transported by the conveying means, and the conveying means base-fixed coordinate system C2 of a second robot is determined on the basis of a measuring point system-fixed, in particular, component-fixed coordinate system of this measuring point system, in particular, component, and the first robot, where in this case said measuring point system is or has been determined by means of the modified transport position determining means, it is possible to dispense advantageously with an additional recalibration of the measuring point systems, in particular, components, even by the second robot as a result of a modification of the transport position determining means.

Consequently in one embodiment the method comprises the steps of:

modifying a or the transport position determining means for determining transport positions;

determining a measuring point system-fixed, in particular, component-fixed coordinate system W'11/W'21 of one or more measuring point systems, in particular, components, W1 or W2, transported by the conveying means, and the first robot by means of the modified transport position determining means; and determining a transformation $T_{C2, W'12/W'22}$ between the measuring point system-fixed, in particular, component-fixed coordinate system W'12/W'22 of the respective measuring point system, in particular, component, and a robot-fixed coordinate system C2 of the second robot(s) on the basis of the measuring point system-fixed, in particular, component-fixed coordinate system W'11/W'21 of the measuring point system, in particular, component, and the first robot, where in this case said measuring point system is or has been determined by means of the modified transport position determining means.

In particular, in one embodiment a transformation between the robot-fixed coordinate system of a second robot and a measuring point system-fixed, in particular, component-fixed coordinate system of a measuring point system, in particular, component, of the second robot can be determined on the basis of a transformation between a measuring point system-fixed, in particular, component-fixed coordinate system of the measuring point system, in particular, component, and the first robot for the original and for the modified transport position determining means, since the modification of the transport position determining means affects the transformations of the first and second robot in the same way.

Correspondingly, in one embodiment following modification of the transport position determining means on the basis of the transformation $T_{C1, W'11/W'21}$ between a measuring point system-fixed, in particular, component-fixed coordinate system W'11/W'21 of one or more measuring point systems, in particular, components, W1 or W2, transported by the conveying means, and a robot-fixed coordinate system C1 of the first robot, in particular, by the (robot) controller of the first robot, a transformation $T_{W11, W'11/W'21, W'21}$ between the measuring point system-fixed, in particular, component-fixed coordinate systems W11/W21 of the respective measuring point system, in particular, component, W1 or W2 and the first robot for the original transport position determining means and the measuring point system-fixed, in particular, component-fixed coordinate systems W'11/W'21 of the respective measuring point system, in particular, component, W1 or W2 and the first robot for the modified transport position determining means is determined; and then on the basis thereof the respective transformation $T_{C2, W'12/W'22}$ between the measuring point system-fixed, in particular, component-fixed coordinate system of the respective measuring point system, in particular, component, and a robot-fixed coordinate system C2 of the second robot(s) for the modified transport position determining means is determined.

In one embodiment the transformation $T_{W_{11}, W_{11}/W_{21}, W_{21}}$ is determined in each case by the (robot) controller of the first robot and is transmitted to the (robot) controller of the second robot(s), where in this case said controller in turn determines on this basis the transformation $T_{C2, W_{12}/W_{22}}$.

In one embodiment the determination of a coordinate system or a transformation can occur in the manner explained above on the basis of positions of corresponding measuring points, which are determined by means of the respective robot.

In one embodiment it is possible to dispense advantageously with an additional recalibration of different measuring point systems, in particular, components, by a second robot, in particular, even after this robot has been exchanged.

If the transformation between the robot-fixed coordinate system of the second robot and the measuring point system-fixed, in particular, component-fixed coordinate systems of different measuring point systems, in particular, components, is determined on the basis of a transformation between a measuring point system-fixed, in particular, component-fixed coordinate system of the respective measuring point system, in particular, component, and the first robot and the robot-fixed coordinate system of the first robot or a measuring point system-fixed, in particular, component-fixed coordinate system of another measuring point system, in particular, component, and the first robot, then it is advantageously sufficient, when swapping a robot, to determine only its conveying means base-fixed coordinate system or to determine the exchange-induced change in the transformation between the robot-fixed and the conveying means base-fixed coordinate systems.

Accordingly, in one embodiment the method comprises the steps of:

exchanging the second robot with a third robot;

determining a transformation $T_{C1, W1'1}$ between a measuring point system-fixed, in particular, component-fixed coordinate system W1'1 of a measuring point system, in particular, component, W1', transported by the conveying means, and a conveying means base-fixed coordinate system C1 of the first robot; and determining a transformation $T_{C2', W1'2'}$ between a conveying means base-fixed coordinate system C2' and a robot-fixed coordinate system R2' of the third robot on the basis of the transformation $T_{C1, W1'1}$ between the measuring point system-fixed, in particular, component-fixed coordinate system and the conveying means base-fixed coordinate system of the first robot.

In one embodiment the determination of a transformation can also be carried out here in the manner explained above on the basis of positions of corresponding measuring points, which are determined by means of the respective robot and on the basis of which the corresponding coordinate systems are determined, in particular, defined.

In one embodiment each measuring point of the component itself can be calibrated by the robot or the position of said each measuring point can be determined. In particular, in order to improve the calibration, in particular, the probing, one embodiment uses, instead, another measuring point system in the form of a measuring point arrangement, which is connected to the conveying means, in particular, integrally formed with the conveying means and which has measuring points, arranged or formed on the conveying means, or in the form of a, in particular, plate-like, calibration component, where in a further development the measuring points of said measuring point arrangement or calibration component are defined geometrically, in particular, by depressions, corners or the like, and/or visually, in particular, in terms of color, by light-dark markings or the like; and/or in a further development the orientation and position of said measuring point arrangement or calibration component transverse to the direction of transport of the conveying means corresponds to the component to be transported by the conveying means and to be handled and/or machined by robots of the system.

A means in the context of the present invention may be formed by hardware and/or software technology, in particular, may comprise a, in particular, digital processing unit, in particular, a microprocessor unit (CPU), which is preferably data or signal-connected to a storage system and/or bus system, and/or one or more programs or program modules. For this purpose the CPU may be configured to process instructions, which are implemented as a program, stored in a storage system, to acquire input signals from a data bus, and/or emit output signals to a data bus. A storage system may comprise one or more, in particular, different, storage media, in particular, optical, magnetic, solid state and/or other non-volatile media. The program may be created in such a way that it is capable of embodying or executing the methods described herein, so that the CPU may carry out the steps of such methods and, thus, can control, in particular, the system, in particular, its robots.

The (robot) controller(s) of the system is/are configured to carry out a method described herein and/or comprise/comprises:

means for determining the positions of at least, in particular, exactly, three measuring points of a first measuring point system, in particular, a component, transported by the conveying means, in a transport position by means of the first robot; and means for determining the position of at least, in particular, exactly, one of these measuring points in another transport position by means of the first robot; and/or means for determining the positions of at least, in particular, exactly, two measuring points of the first measuring point system, in particular, component, in a transport position and the position of at least, in particular, exactly, one further measuring point in this transport position or of at least, in particular, exactly, one of these measuring points in another transport position by means of at least one second robot of the system.

In one embodiment the (robot) controller(s) of the system comprise/comprises:

means for determining a transformation between a conveying means base-fixed coordinate system and a robot-fixed coordinate system of the first robot and/or a transformation between a measuring point system-fixed, in particular, a component-fixed coordinate system of the first measuring point system, in particular, component, and a conveying means base-fixed coordinate system of the first robot on the basis of the at least, in particular, exactly, four positions determined by means of the first robot; and/or means for determining a transformation between a robot-fixed coordinate system and a conveying means base-fixed coordinate system of the second robot on the basis of the at least three positions determined by means of the second robot; and/or means for determining a transformation between a measuring point system-fixed, in particular, a component-fixed coordinate system of a measuring point system, in particular, a component, transported by the conveying means, and a conveying means base-fixed coordinate system of the second robot on the basis of a transformation between the measuring point system-fixed, in particular, component-fixed coordinate system of the measuring point system, in particular, component, and a conveying means base-fixed coordinate system of the first robot or a measuring point system-fixed, in particular, component-fixed coordinate system of another measuring point system, in particular, component, and the first robot; and/or means for calibrating a transport position determining means of the system on the basis of the position, determined by the first robot, of at least one of the measuring points in the one and in the other transport position; and/or means for determining at least one measuring point system-fixed, in particular, component-fixed coordinate system of a measuring point system, in particular, component, and the first robot (10) by means of a modified transport position determining means; and means for determining a transformation between the measuring point system-fixed, in particular, component-fixed coordinate system of the respective measuring point system, in particular, component, and a conveying means base-fixed coordinate system of the second robot on the basis of this measuring point system-fixed, in particular, component-fixed coordinate system of the measuring point system, in particular, component, and the first robot; and/or means for determining a transformation between a measuring point system-fixed, in particular, a component-fixed coordinate system of a measuring point system, in particular, a component, transported by the conveying means, and a conveying means base-fixed coordinate system of the first robot; and means for determining a transformation between a conveying means base-fixed coordinate system and a robot-fixed coordinate system of a third robot, with which a second robot was exchanged, on the basis of the transformation between the measuring point system-fixed, in particular, component-fixed coordinate system and the conveying means base-fixed coordinate system of the first robot; and/or means for determining transport positions on the basis of detected movement of the conveying means relative to a synchronization position; and/or means for determining the synchronization position on the basis of a detection of the corresponding measuring point system, in particular, component, transported by the conveying means.

In one embodiment a, in particular, first component, transported by the conveying means, may or might be arranged on the conveying means in a non-destructive releasable manner, in particular, loosely. Similarly, in one embodiment it is also possible to use for calibration purposes a measuring point arrangement, which is permanently connected to the conveying means, in particular, integrally formed with the conveying means; in particular, it is possible to use measuring points, which are or will be arranged on the conveying means itself. Therefore, a measuring point system in the context of the present invention can be, in particular, a component, which is to be handled and/or machined by the robot; a measuring point arrangement, which is connected to the conveying means, in particular, integrally formed with the conveying means, with measuring points, arranged or formed on the conveying means; or a, in particular, plate-like, calibration component. Other advantages and features will become apparent from the dependent claims and the exemplary embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
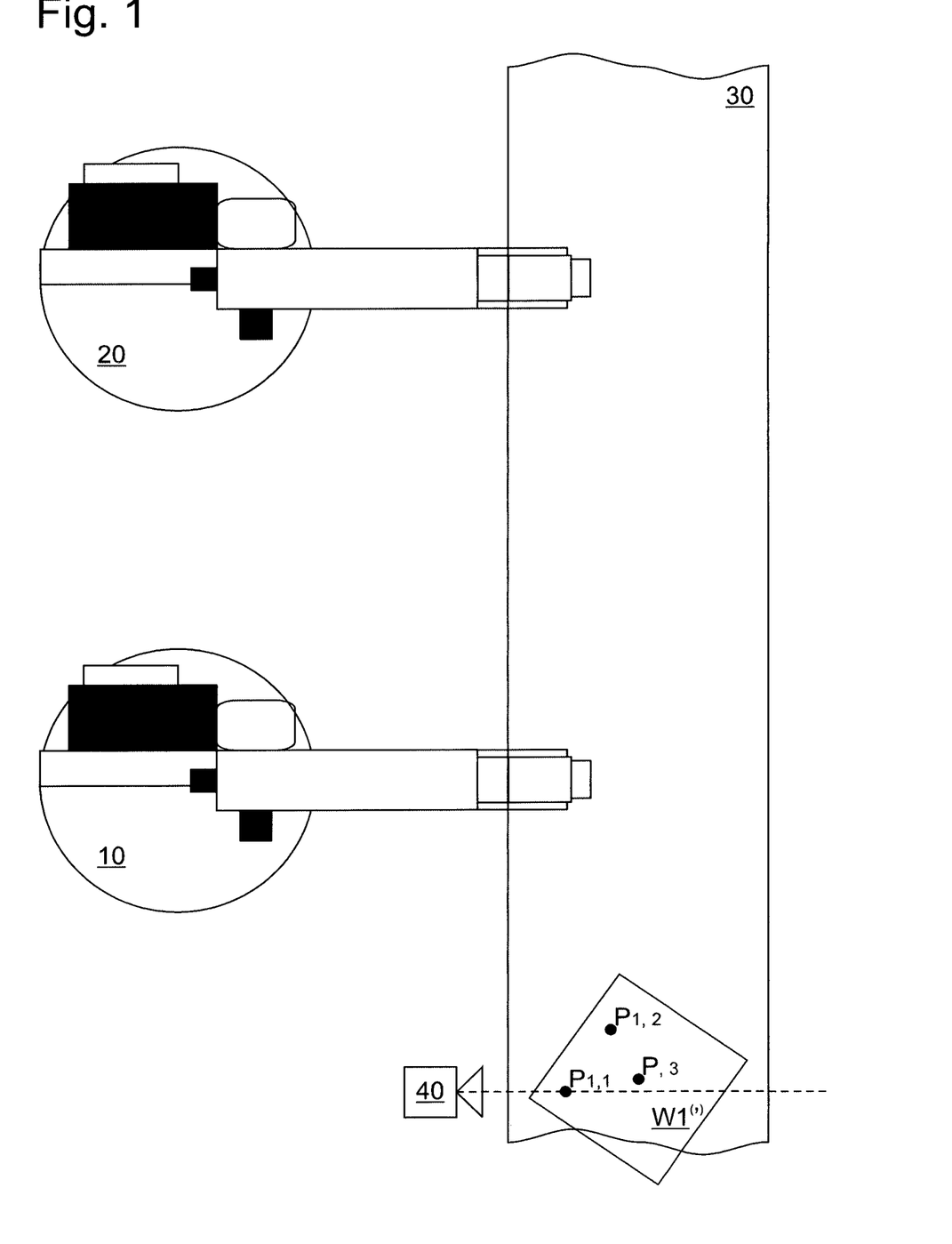
FIG. 1 depicts an exemplary conveying system for calibration by a method in accordance with the present disclosure.

FIG. 1 shows a system with a linear conveying means in the form of a conveyor belt 30, a first robot 10 and a second robot 20 for handling and/or machining first and second components, which differ from each other and/or in their orientation and/or position perpendicular to the direction of transport of the conveyor belt (vertically upwards in FIG. 1).

The invention is described below by way of example with reference to the two robots and types of component; it goes without saying that analogous to the one second robot, additional (second) robots and/or, analogous to the one second component, additional (second) components may also be present; the and/or their orientation and/or position perpendicular to the direction of transport of the conveyor belt differ/differs from that or those of the first and a second component(s), where in this case the features described herein can be realized in the same way even for these additional robots and/or components.

In a step illustrated in FIG. 1, a plate-like calibration component W1 is placed on the conveyor belt in such a way that its orientation and position transverse to the direction of transport of the conveying means corresponds to a first component.

Calibration component W1 has three measuring points $P_{1,1}$, $P_{1,2}$, and $P_{1,3}$, which are geometrically defined in such a way that they can be probed by the robots 10, 20 with precision. As an alternative, one of the first components can also be used directly. As an alternative, the measuring points can also be arranged or formed on the conveyor belt itself; or a measuring point system, formed integrally with the conveyor belt, can be used.

A camera of a transport position determining means 40 is used for capturing, as soon as the calibration plate W1 passes a synchronization position, indicated in FIG. 1 by a horizontal dashed line. As indicated by vertical arrows upwards in FIGS. 2 to 4, a transport position $\delta$ of the calibration plate W1 relative to this synchronization position is determined on the basis of a movement of the conveying means, with said movement being detected by a rotary encoder of the transport position determining means 40, in particular, on the basis of an angle of rotation y of the rotary encoder.

In this case, in the position shown in FIG. 1, the camera of the transport position determining means 40 can be calibrated by means of the calibration component W1. In particular, for this purpose the calibration component can be arranged by means of the conveying means 30 in the field of view of the camera; and intrinsic and/or extrinsic camera parameters can be determined on the basis of the camera image.

Figure 2:
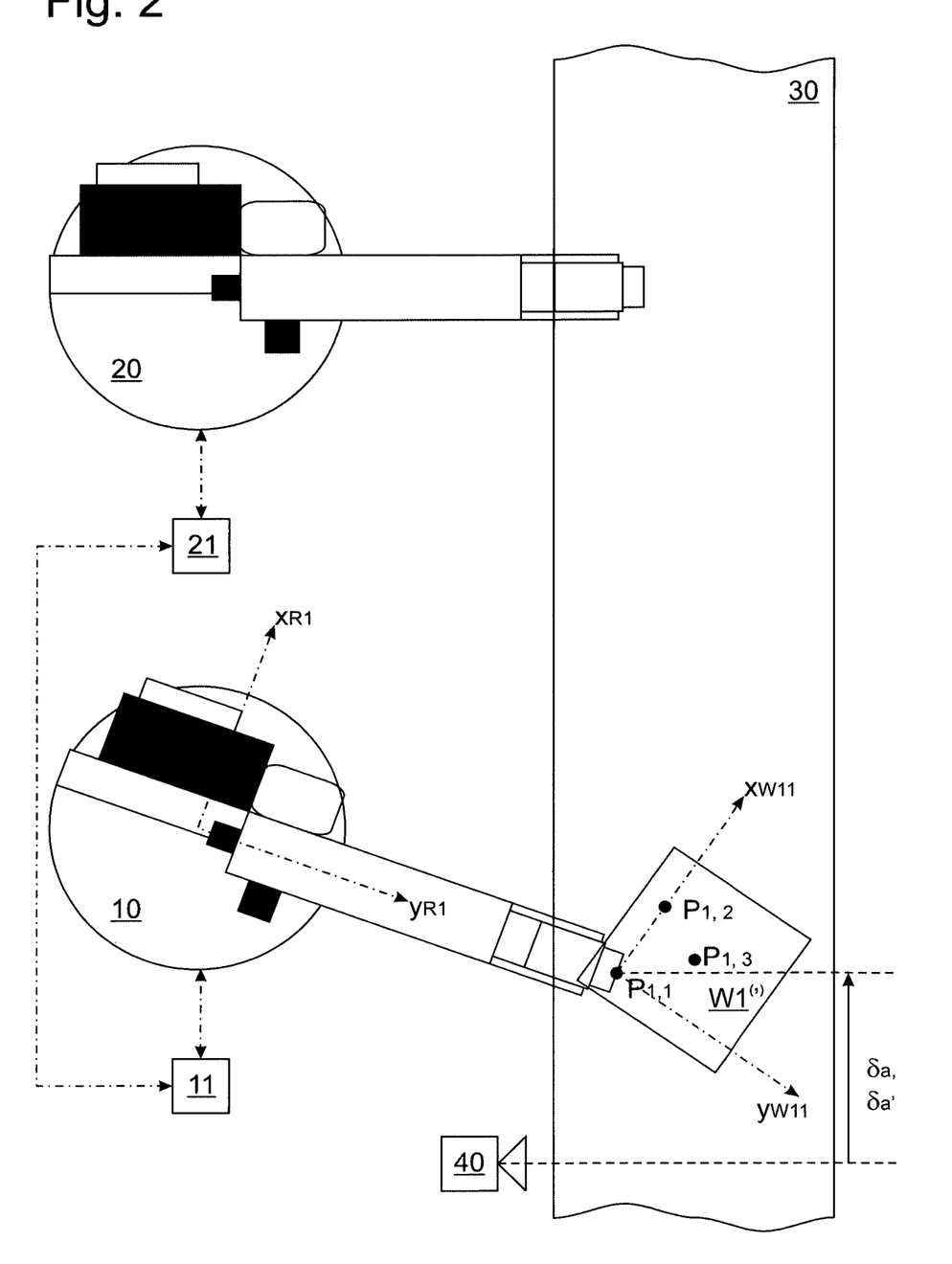
FIG. 2 depicts the conveying system of FIG. 1 in a second configuration wherein calibration component is in a different position.

In a step shown in FIG. 2, the calibration plate W1 is transported by the conveyor belt 30 into a transport position $\delta_a$, in which the positions $p_{1,1}(\delta_a)$, $p_{1,2}(\delta_a)$, $p_{1,3}(\delta_a)$ of the three measuring points $P_{1,1}, P_{1,2}$ and $P_{1,3}$ are determined by means of the first robot 10 in its robot-fixed coordinate system R1, indicated by $x_{R1}, y_{R1}$, in that said robot probes the measuring points. As an alternative, measuring points could also be detected visually; or geometrically defined straight lines or planes could be traversed.

On the basis of these positions, a controller 11 of the first robot 10 defines a component-fixed coordinate system W11 ($\delta_a$) of the calibration plate W1 and the first robot, with the origin of said coordinate system lying at the point $P_{1,1}$; with the X axis of said coordinate system passing through the point $P_{1,2}$; with the Z axis of said coordinate system being perpendicular to the plane of transport, defined by the points $P_{1,1}, P_{1,2}$ and $P_{1,3}$; and with said coordinate system being indicated by $x_{W11}, y_{W11}$.

Figure 3:
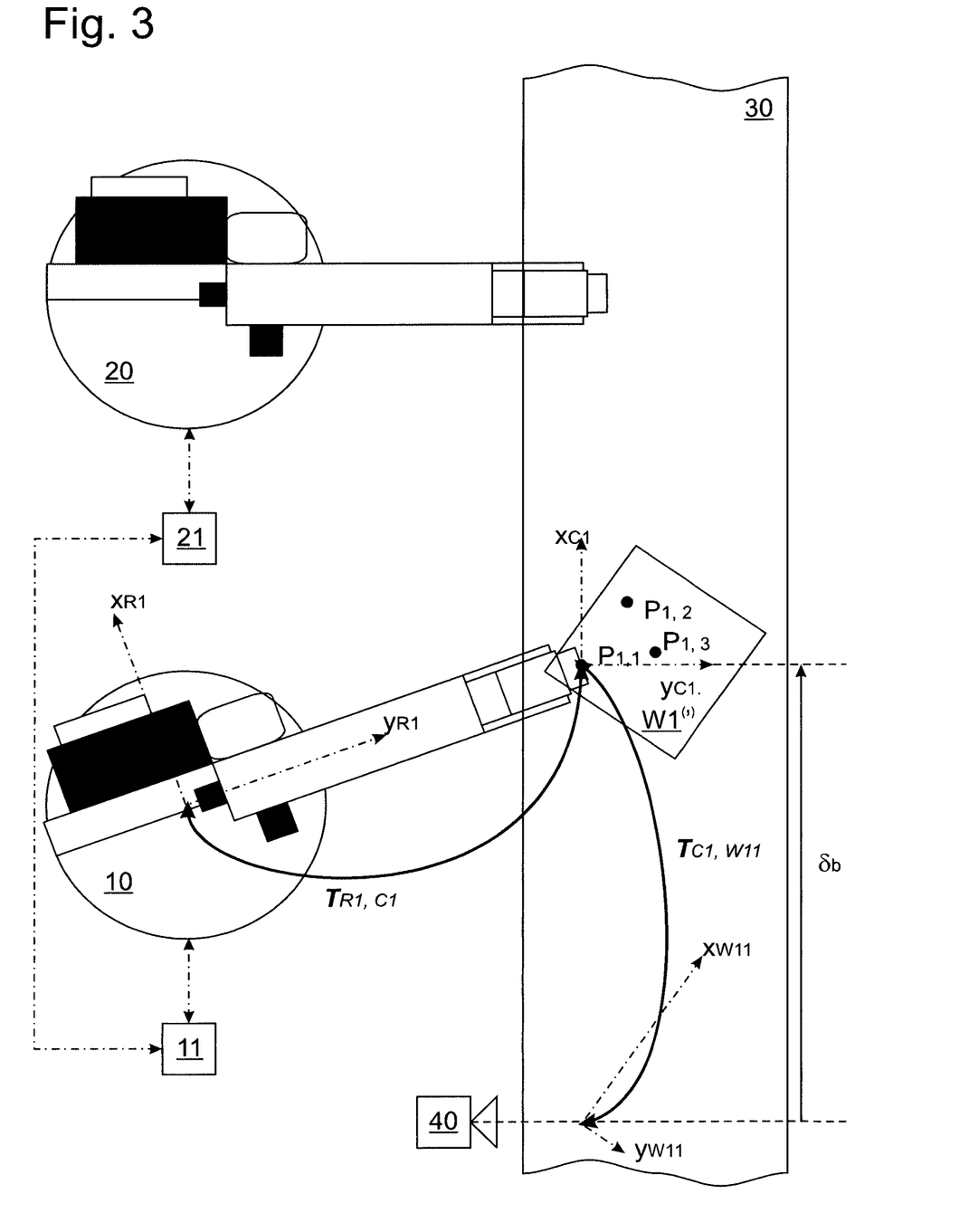
FIG. 3 depicts the conveying system of FIG. 2 wherein the calibration component is further moved.

In a step shown in FIG. 3, the calibration plate W1 is transported by the conveyor belt 30 into another transport position $\delta_b$, in which the position $p_{1,1}$ ($\delta_b$) of the measuring point $P_{1,1}$ is determined by means of the first robot 10 in its robot-fixed coordinate system R1.

On the basis of the positions $p_{1,1}$ ($\delta_a$), $p_{1,1}$ ($\delta_b$) and $p_{1,2}$ ($\delta_a$) or $p_{1,3}$ ($\delta_a$) the controller 11 defines a conveying means base-fixed coordinate system C1 of the first robot, with the X axis of said coordinate system passing through the positions $p_{1,1}$ ($\delta_a$), $p_{1,1}$ ($\delta_b$) and, thus, aligned with the direction of transport; with the Z axis of said coordinate system being perpendicular to the transport plane, defined by three of the positions $p_{1,1}$ ($\delta_a$), $p_{1,1}$ ($\delta_b$), $p_{1,2}$ ($\delta_a$) and $p_{1,3}$ ($\delta_a$); with the origin of said coordinate system lying, for example, in the positions $p_{1,1}$ ($\delta_a$) or $p_{1,1}$ ($\delta_b$); and said coordinate being indicated by means of $x_{C1}, y_{C1}$.

In addition, a rotary encoder transmission ratio of the encoder of the transport position determining means 40 is calibrated on the basis of the position $p_{1,1}$ ($\delta_a$), determined by means of the first robot 10, of the measuring point $P_{1,1}$ in the one transport position and on the basis of the position $p_{1,1}$ ($\delta_b$), determined by means of the first robot 10, of the same measuring point $P_{1,1}$ in the other transport position: by determining the positions of the same measuring point in the one and in the other transport position it is possible to determine, in particular, a (transport) distance, traveled by the measuring point $P_{1,1}$ and, thus, also by the conveying means 30. By comparing this (transport) distance with the angle of rotation ψ, which the rotary encoder of the transport position determining means 40 has detected between the one and the other transport position, it is possible to determine a rotary encoder transmission ratio between the (transport) distance of the conveying means 30 and the angle of rotation of the rotary encoder of the transport position determining means 40: $[|p_{1,1}(\delta_b) - p_{1,1}(\delta_a)|/\psi]$ Subsequently, the component-fixed coordinate system W11 of the calibration plate W1 and the first robot is rotated by $\delta_a$, i.e., displaced into the synchronization position (W11=W11 ($\delta$=0)), in the direction opposite to the X axis of the coordinate system C1, so that later in operation the origin of the component-fixed coordinate system is in the synchronous position after the synchronization switch has been triggered, and determines the transformations $T_{R1, C1}$ between the conveying means base-fixed coordinate system C1 and the robot-fixed coordinate system R1 as well as $T_{C1, W11}$ between the component-fixed coordinate system W11 and the conveying means base-fixed coordinate system C1.

It can be seen that advantageously both coordinate systems C1, W11 or transformations $T_{R1, C1}, T_{C1, W11}$ are determined advantageously on the basis of only four determined positions $p_{1,1}$ ($\delta_a$), $p_{1,1}$ ($\delta_b$), $p_{1,2}$ ($\delta_a$) and $p_{1,3}$ ($\delta_a$).

Figure 4:
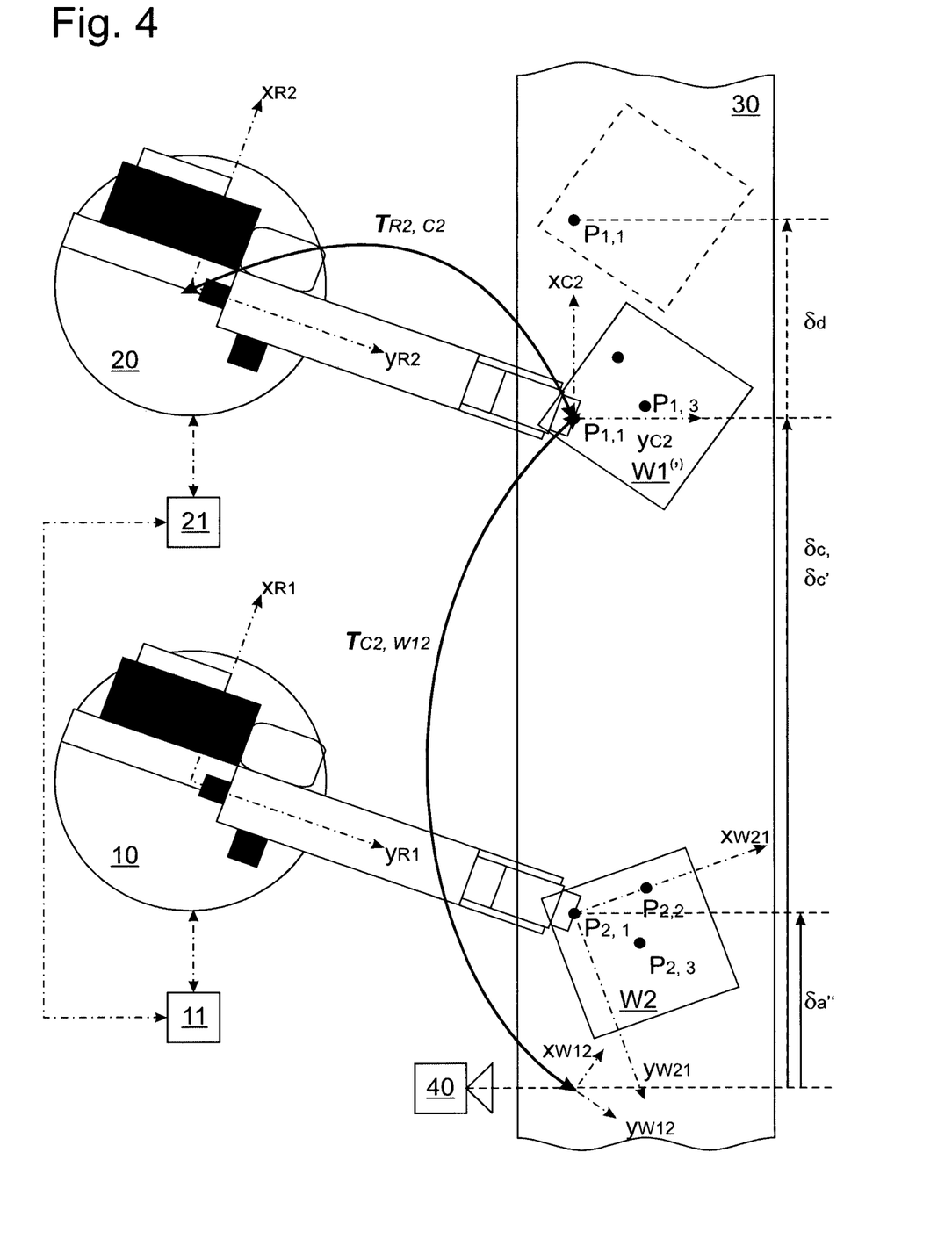
FIG. 4 depicts the conveying system of FIG. 3 wherein the calibration plate is further moved and a second calibration plate is introduced.

In a step illustrated in FIG. 4, the calibration plate W1 is transported by the conveyor belt 30 into a transport position $\delta_c$, in which the positions $p_{1,1}$ ($\delta_c$) and $p_{1,2}$ ($\delta_c$) or $p_{1,3}$ ($\delta_c$) of the measuring points $P_{1,1}$ and $P_{1,2}$ or $P_{1,3}$ are determined by means of the second robot 20 in its robot-fixed coordinate system R2, indicated by $x_{R2}, y_{R2}$. Subsequently the calibration plate W1 is transported, analogous to the sequence of figures FIG. 2→FIG. 3, by the conveyor belt 30 into another transport position $\delta_d$, in which the position $p_{1,1}$ ($\delta_d$) of the measuring point PR, 1 is determined by means of the second robot 20 in its robot-fixed coordinate system R2.

On the basis of the positions $p_{1,1}$ ($\delta_c$), $p_{1,1}$ ($\delta_d$) and $p_{1,2}$ ($\delta_c$) or $p_{1,3}$ ($\delta_c$) a controller 21 of the second robot 20 defines a conveying means base-fixed coordinate system C2 of the second robot, with the X axis of said coordinate system passing through the positions $p_{1,1}$ ($\delta_c$), $p_{1,1}$ ($\delta_d$) and, as a result, is aligned with the direction of transport; with the Z axis of said coordinate system being perpendicular to the transport plane, defined by three of the positions $p_{1,1}$ ($\delta_c$), $p_{1,1}$ ($\delta_d$), $p_{1,2}$ ($\delta_c$) and $p_{1,3}$ ($\delta_c$); and with the origin of said coordinate system being, for example, in the position $p_{1,1}$ ($\delta_c$) or $p_{1,1}$ ($\delta_d$); and said coordinate system is indicated by $x_{C2}, y_{C2}$.

A transformation $T_{C2, W12}$ between this conveying means base-fixed coordinate system C2 of the second robot 20 and a component-fixed coordinate system W12 of the calibration plate W1 and the second robot 20 is determined by the controller 21 on the basis of the transformation $T_{C1, W11}$ between the conveying means base-fixed coordinate system C1 of the first robot 10 and the component-fixed coordinate system W11 of the calibration plate W1 and the first robot 10. For this purpose the controller 11 transmits the (parameters of) $T_{C1, W11}$ to the controller 21, which is connected or communicates with said controller by data technology.

Since the two coordinate systems C1, C2 of the first and second robot are displaced relative to each other only along their aligned X axis, the rotation into the component-fixed coordinate system or the transformation $T_{C1, W11}$ can be applied directly or unchanged. The component-fixed coordinate system W12 of the calibration plate W1 and the second robot 20 is also displaced relative to the X axis of the coordinate system C2 into the synchronization position; this displacement can also be determined, in the same manner as the displacement of the coordinate systems C1, C2, directly from the transport positions.

If in a modification the origin of the conveying means base-fixed coordinate system C2 of the second robot 20 and the origin of the conveying means base-fixed coordinate system C1 of the first robot 10 coincide, since, for example, the coordinate system C2 has been moved correspondingly ($\delta_{a/b} - \delta_{c/d}$) relative to the X axis of the coordinate system C2 into the origin of the coordinate system C1, then the transformation $T_{C1, W12}$ can be applied even completely directly or unchanged ($T_{C2, W12} = T_{C1, W11}$).

It can be seen that both coordinate systems C2, W12 or transformations $T_{R2, C2}, T_{C2, W12}$ are determined advantageously on the basis of only three determined positions $p_{1,1}$ ($\delta_c$), $p_{1,1}$ ($\delta_d$) and $p_{1,2}$ ($\delta_c$) or $p_{1,3}$ ($\delta_c$) and the transmitted transformation $T_{C1, W11}$ between the conveying means base-fixed coordinate system C1 of the first robot 10 and the component-fixed coordinate system W11 of the calibration plate W1 and the first robot 10.

FIG. 4 also shows the calibration of a second calibration plate W2 by the first robot 10, with the orientation and position of said calibration plate transverse to the direction of transport of the conveying means corresponding to a second component.

In an analogous manner, explained above with reference to W1 and FIGS. 2, 3, it is also possible to determine for this second calibration plate W2 (or the second components) by determining the positions $p_{2,1}$ ($\delta_{a''}$), $p_{2,2}$ ($\delta_{a''}$) and $p_{2,3}$ ($\delta_{a''}$) of three measuring points $P_{2,1}$, $P_{2,2}$, and $P_{2,3}$ by means of the first robot 10 in its coordinate system R1, a component-fixed coordinate system W21 ($\delta_{a''}$) of the calibration plate W2 and the first robot, and from this, after the displacement of said coordinate system into the synchronization position, the transformation $T_{C1, W21}$ between this component-fixed coordinate system W21=W21 ($\delta$=0) and the conveying means base-fixed coordinate system C1.

In an analogous manner explained above with reference to W11, W12 and FIG. 4, it is also possible to determine for this second calibration plate (or the second components) for the second robot in each case a transformation $T_{C2, W22}$ between a component-fixed coordinate system W22, in particular, displaced into the synchronization position, of the second calibration plate W2 and the conveying means base-fixed coordinate system C2 of the second robot on the basis of this transformation $T_{C1, W21}$ between the component-fixed coordinate system W11 and the conveying means base-fixed coordinate system C1 of the first robot.

Similarly, the controller 11 can determine then the transformation $T_{W1, W21}$ between the two component-fixed coordinate systems W11, W21 and the first robot, for example, according to $T_{W11, W21} = T_{C1, W21} (T_{C1, W11})^{-1}$. This transformation can be transmitted by the controller 11 to the controller 21, which can easily determined therefrom and the already determined transformation $T_{C2, W12}$ the transformation $T_{C2, W22}$, for example, according to $T_{C2, W22} = T_{W11, W21} T_{C2, W12}$.

It can be seen that advantageously a new component, in the example explained above, has to calibrate, as an example, the second component or its corresponding calibration plate W2, only for or by the first robot 10; and the transformations between the conveying means base-fixed and the component-fixed coordinate system of the other robot, in the example explained above, as an example, the second robot 20, are determined on the basis of the transformations between the two component-fixed coordinate systems W11, W21 and the first robot. Instead of this transformation $T_{W11, W21}$, it is also possible for the transformation $T_{C1, W21}$ to be transmitted to the controller 21, which can determine from this in turn the transformation $T_{C2, W22}$ in the manner explained above.

If the second robot 20 is exchanged with a third robot, then the positions $p_{1,1}$ ($\delta_{a'}$), $p_{1,2}$ ($\delta_{a'}$) and $p_{1,3}$ ($\delta_{a'}$) are determined, in an analogous manner explained above with reference to FIGS. 2, 4, by means of the first robot; and the positions $p_{1,1}$ ($\delta_{c'}$), $p_{1,2}$ ($\delta_{c'}$) and $p_{1,3}$ ($\delta_{c'}$) of the measuring points of a calibration plate W1' or a component itself are determined by means of the new third robot. This calibration plate W1' serves only as a reference body for calibrating the exchanged third robot and, therefore, does not have to correspond to any component.

The distance between these two transport positions $\delta_a$, $\delta_{c'}$ corresponds to the distance between the two transport positions $\delta_a$, $\delta_c$, at which the positions $p_{1,1}$ ($\delta_a$), $p_{1,2}$ ($\delta_a$) and $p_{1,3}$ ($\delta_a$) were determined by means of the first robot, and the positions $p_{1,1}$ ($\delta_c$) and $p_{1,2}$ ($\delta_c$) or $p_{1,3}$ ($\delta_c$) were determined ($\delta_{c'} - \delta_a = \delta_c - \delta_a$) by means of the exchanged second robot, so that the displacement of the two conveying means base-fixed coordinate systems of the original and of the exchanged robot to the conveying means base-fixed coordinate system of the first robot remains the same. In one embodiment the original transport positions were stored for this purpose.

The controller 11 determines on the basis of the positions $p_{1,1}$ ($\delta_{a'}$), $p_{1,2}$ ($\delta_{a'}$) and $p_{1,3}$ ($\delta_{a'}$), in the manner explained above, a component-fixed coordinate system W1'1, on the basis of which a transformation $T_{C1, W1'1}$ between this component-fixed coordinate system W1'1 and the conveying means base-fixed coordinate system C1 of the first robot, and transmits this transformation $T_{C1, W1'1}$ (or its parameters) to the controller of the new, third robot. Said controller determines, on the basis of the positions $p_{1,1}$ ($\delta_{c'}$), $p_{1,2}$ ($\delta_{c'}$) and $p_{1,3}$ ($\delta_{c'}$), in the manner explained above, a component-fixed coordinate system W1'2'; from this the transformation $T_{R2', W1'2}$ between the component-fixed coordinate system W1'2 and the coordinate system R2' of the new robot, and therefrom the transformation $T_{R2', C2'}$ between a robot-fixed coordinate system R2' and the corresponding conveying means base-fixed coordinate system C2 of the new robot, for example, according to $T_{R2', C2'} = (T_{C1, W1'1})^{-1} T_{R2', W1'2}$, provided the coordinate systems C1, C2 match.

It can be seen that advantageously when exchanging a robot only its conveying means base-fixed coordinate system is recalibrated in a simple manner.

If the camera 40 is exchanged, then this corresponds to a modification of the transport position determining means, since another synchronization position is defined by the exchanged camera.

Therefore, in such a case, in an analogous manner explained above with reference to FIGS. 2, 4, the positions $p_{1,1}$ ($\delta_a$), $p_{1,2}$ ($\delta_a$) and $p_{1,3}$ ($\delta_a$) as well as $p_{2,1}$ ($\delta_{a''}$), $p_{2,2}$ ($\delta_{a''}$) and $p_{2,3}$ ($\delta_{a''}$) of the calibration plates W1, W2 or a first or second component are determined again by means of the first robot.

In an analogous manner explained above with reference to W11, W12 and FIG. 4, it is also possible to determine for the second robot respectively a transformation $T_{C2, W'12}$, $T_{C2, W'22}$ between a component-fixed coordinate system of the calibration plate W1 or W2 and the conveying means base-fixed coordinate system C2 of the second robot on the basis of the new synchronization position.

For this purpose, in particular, the controller 11 can determine then, in an analogous manner explained above, for each calibration plate respectively the transformation $T_{W11, W'11}$ or $T_{W21, W'21}$ between the two component-fixed coordinate systems and the first robot for the old and new synchronization position: $T_{W11, W'11} = T_{C1, W'11} (T_{C1, W11})^{-1}$ or $T_{W12, W'12} = T_{C1, W'12} (T_{C1, W12})^{-1}$. This transformation can be transmitted by the controller 11 to the controller 21, which can determine therefrom and the already determined transformation $T_{C2, W12}$ or $T_{C2, W22}$ in a simple way the transformations $T_{C2, W'12}$, $T_{C2, W'22}$: $T_{C2, W'12} = T_{W11, W'11} T_{C2, W12}$ or $T_{C2, W'22} = T_{W21, W'21} T_{C2, W22}$. Similarly the controller 11 can also transmit the transformations $T_{C1, W'11}$, $T_{C1, W'21}$ to the controller 21.

It can be seen that advantageously when modifying the transport position determining means only the component-fixed coordinate systems of the first robot are recalibrated.

Although exemplary embodiments have been explained in the foregoing description, it should be pointed out that a variety of modifications are possible. It should also be noted that the exemplary embodiments are merely examples that are not intended to limit the scope of protection, the applications and the configuration in any way. Instead, the preceding description gives the skilled person a guide for the implementation of at least one exemplary embodiment, where in this case various changes, in particular, with regard to the function and arrangement of the described components, can be made without departing from the scope of protection, which will become apparent from the claims and combinations of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS AND SYMBOLS

| | |
|---|---|
| 10 | first robot |
| 11 | robot controller of the first robot |
| 20 | second robot |
| 21 | robot controller of the second robot |
| 30 | conveyor belt |
| 40 | transport position determining means (camera, encoder) |
| $P_{i,j}$ | measuring point j of the calibration body Wi |
| Wi | calibration plate (component) |
| $\delta_{(a, a', a'', b, c, c', d)}$ | transport position(s) |
| $T_{Ri, Ci}$ | transformation between robot-fixed and conveying means base-fixed coordinate system of the i. robot |
| $T_{Ci, Wji}$ | transformation between conveying means base-fixed and component-fixed coordinate system of the component j and the i. robot |

What is claimed is:

1. A method for calibrating a system with a translational conveying means and at least a first robot, the method comprising:
   determining with the first robot the positions of at least three measuring points of a first measuring point system transported via curvilinear translation by the conveying means in a first transport position;
   at least one of:
   A) determining the position of at least one of the measuring points in a second transport position with the first robot, or
   B) determining with at least one second robot of the system:
   (i) the positions of at least two measuring points of the first measuring point system in a third transport position, and
   (ii) the position of at least one other measuring point in the third transport position, or at least one of the measuring points in a fourth transport position; and
   calibrating at least one measuring point system associated with the robot, the conveying means, or a component transported by the conveying means based on the determination.

2. The method of claim 1, wherein at least one of:
   determining the positions of at least three measuring points in the first transport position comprises determining the positions of exactly three measuring points;
   the first measuring point system is a measuring point system of a component transported by the conveying means;
   determining the position of at least one of the measuring points in a second transport position comprises determining exactly one of the measuring points;
   determining the positions of at least two measuring points in the third transport position comprises determining the positions of exactly two measuring points;
   determining the position of at least one other measuring point in the third transport position comprises determining the position of exactly one other measuring point; or
   determining the position of at least one of the measuring points in the fourth transport position comprises determining the position of exactly one of the measuring points.

3. The method of claim 1, further comprising determining at least one of:
   a transformation between a conveying means base-fixed coordinate system and a robot-fixed coordinate system of the first robot; or
   a transformation between a measuring point system-fixed coordinate system of the first measuring point system and a conveying means base-fixed coordinate system of the first robot;
   wherein the transformation is determined on the basis of at least four positions determined with the first robot.

4. The method of claim 3, wherein at least one of:
   the measuring point system-fixed coordinate system is a component-fixed coordinate system; or
   the transformation is determined on the basis of exactly four positions determined with the first robot.

5. The method of claim 1, further comprising:
   determining a transformation between a robot-fixed coordinate system and a conveying means base-fixed coordinate system of the second robot on the basis of at least three positions determined with the second robot.

6. The method as of claim 1, further comprising:
   determining a transformation between a measuring point system-fixed coordinate system of the first measuring point system or another measuring point system transported by the conveying means, and a conveying means base-fixed coordinate system of the second robot;
   wherein the transformation is determined based on a transformation between the measuring point system-fixed coordinate system of the measuring point system and one of:
   a conveying means base-fixed coordinate system of the first robot, or
   a measuring point system-fixed coordinate system of a second measuring point system and the first robot.

7. The method of claim 6, wherein at least one of:
   at least one of the measuring point system-fixed coordinate systems is a component-fixed coordinate system; or
   at least one of the measuring point systems is a component transported by the conveying means.

8. The method of claim 1, further comprising calibrating a transport position determining means for determining transport positions on the basis of the position, determined by the first robot, of at least one of the measuring points in the first transport position and in at least one of the second, third, or fourth transport positions.

9. The method of claim 1, further comprising:
   modifying a transport position determining means for determining transport positions;

determining at least one measuring point system-fixed coordinate system of a measuring point system and the first robot using the modified transport position determining means; and determining a transformation between the measuring point system-fixed coordinate system of the respective measuring point system and a conveying means base-fixed coordinate system of the second robot on the basis of the determined measuring point system-fixed coordinate system of the measuring point system and the first robot.

10. The method of claim 9, wherein at least one of:

at least one of the measuring point system-fixed coordinate systems is a component-fixed coordinate system; or at least one of the measuring point systems is a component transported by the conveying means.

11. The method of claim 1, further comprising:

exchanging the second robot with a third robot;

determining a transformation between a measuring point system-fixed coordinate system of a measuring point system transported by the conveying means and a conveying means base-fixed coordinate system of the first robot; and determining a transformation between a conveying means base-fixed coordinate system and a robot-fixed coordinate system of the third robot on the basis of the determined transformation between the measuring point system-fixed coordinate system and the conveying means base-fixed coordinate system of the first robot.

12. The method of claim 11, wherein at least one of:

the measuring point system-fixed coordinate system is a component-fixed coordinate system; or the measuring point system is a component transported by the conveying means.

13. The method of claim 1, wherein transport positions are determined on the basis of a detected movement of the conveying means relative to a synchronization position.

14. The method of claim 13, wherein the synchronization position is determined on the basis of a detection of the corresponding measuring point system transported by the conveying means.

15. The method of claim 14, wherein the measuring point system is a component transported by the conveying means.

16. The method of claim 1, wherein at least one of the first measuring point system or another measuring point system is a measuring point arrangement that is permanently connected to the conveying means and having measuring points arranged on the conveying means or a calibration component;

wherein at least one of:

the measuring points are at least one of geometrically or optically defined, or the orientation and position of the measuring point system transverse to a direction of transport of the conveying means corresponds to a component to be transported by the conveying means and to be at least one of handled or machined by robots of the system.

17. The method of claim 16, wherein the measuring point arrangement is integrally formed with the conveying means.

18. A system for handling and/or machining components transported by a conveying means of the system, by robots of the system, the system comprising a controller configured for carrying out the method of claim 1.

19. A computer program product having a program code stored on a non-transitory, computer-readable storage medium, the program code, when executed by one or more processors, causes the one or more processors to:

determine with a first robot the positions of at least three measuring points of a first measuring point system transported via curvilinear translation by translational conveying means associated with the first robot in a first transport position;

at least one of:

A) determine the position of at least one of the measuring points in a second transport position with the first robot, or B) determine with at least one second robot:

i) the positions of at least two measuring points of the first measuring point system in a third transport position, and ii) the position of at least one other measuring point in the third transport position, or at least one of the measuring points in a fourth transport position; and calibrate at least one measuring point system associated with the first robot, the second robot, the conveying means, or a component transported by the conveying means based on the determination.

* * * * *